(12) United States Patent
Koga et al.

(10) Patent No.: US 6,737,166 B2
(45) Date of Patent: May 18, 2004

(54) SANITARY WARE

(75) Inventors: Naoki Koga, Fukuoka (JP); Hidemi Ishikawa, Fukuoka (JP); Ryosuke Kato, Fukuoka (JP); Atsushi Yoshida, Fukuoka (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 10/240,790

(22) PCT Filed: Jan. 29, 2001

(86) PCT No.: PCT/JP01/00583
§ 371 (c)(1),
(2), (4) Date: Oct. 4, 2002

(87) PCT Pub. No.: WO01/77041
PCT Pub. Date: Oct. 18, 2001

(65) Prior Publication Data
US 2003/0124359 A1 Jul. 3, 2003

(30) Foreign Application Priority Data

Apr. 6, 2000 (JP) .......................................... 2000-104528
Sep. 11, 2000 (JP) .......................................... 2000-274674

(51) Int. Cl.$^7$ .......................... B32B 17/06; B32B 9/00; C03C 10/00
(52) U.S. Cl. ....................... 428/432; 428/426; 428/428; 501/32; 501/104
(58) Field of Search .................................. 428/426, 428, 428/432; 501/32, 104

(56) References Cited

U.S. PATENT DOCUMENTS

| | | | |
|---|---|---|---|
| 5,372,976 A | 12/1994 | Matsumoto et al. | |
| 5,641,720 A | 6/1997 | Fassbinder | |
| 6,107,223 A | 8/2000 | Koga et al. | |
| 6,242,117 B1 * | 6/2001 | Koga et al. | 428/701 |
| 6,383,646 B1 * | 5/2002 | Tomioka et al. | 428/428 |

FOREIGN PATENT DOCUMENTS

| | | |
|---|---|---|
| EP | 0 584 977 A1 | 3/1994 |
| EP | 0 784 036 A1 | 7/1997 |
| JP | 6-56516 A | 3/1994 |
| JP | 6-305809 A | 11/1994 |
| JP | 7-232312 A | 9/1995 |
| JP | 7-237958 A | 9/1995 |
| JP | 8-59333 A | 3/1996 |
| JP | 11-500994 A | 1/1999 |
| WO | 96/0996 | 4/1996 |
| WO | 96/16915 A1 | 6/1996 |
| WO | 97/26223 A1 | 7/1997 |

* cited by examiner

*Primary Examiner*—Deborah Jones
*Assistant Examiner*—G. Blackwell-Rudasill
(74) *Attorney, Agent, or Firm*—Birch, Stewart, Kolasch & Birch, LLP (57) ABSTRACT

The present invention provides the sanitary ware for which it is possible to accurately design the shapes and dimensions of the products after being subjected to firing while maintaining the mechanical strength required to sanitary ware, degradation of the process yield caused by shrinkage and deformation scarcely occurs, and the setting efficiency and productivity are improved as compared to the prior art. The sanitary ware of the present invention is the sanitary ware which includes a ceramic body and a glaze layer formed on the desired portions of the body surface, and is characterized in that the CaO component segregation portions in which portions the CaO component is segregated are dispersed in the body.

35 Claims, 5 Drawing Sheets

FIG. 7 ary ware such as
washhand basins, wash bowls, urinals, stools, toilet tanks,
toilet strainers, and the like.

SANITARY WARE

This application is the national phase under 35 U.S.C. §371 of PCT International Application No. PCT/JP01/00583 which has an International filing date of Jan. 29, 2001, which designated the United States of America.

TECHNICAL FIELD

The present invention relates to sanitary ware such as washhand basins, wash bowls, urinals, stools, toilet tanks, toilet strainers, and the like.

BACKGROUND ART

Such sanitary ware as washhand basins, wash bowls, urinals, stools, toilet tanks, toilet strainers, and the like are daily necessities, and are required to have such a sufficient mechanical strength that even a very heavy person can use, while resting the person's weight, some of these articles without anxiety. In addition, a good quality of design is also required.

Furthermore, the above mentioned commodities are used in the portions of a house where water is used, and hence these commodities are required to have chemical stability.

Accordingly, from old times, glazed ceramic wares have been used as sanitary ware, and particularly, glazed ironstone bodies and glazed vitrifiable bodies have been generally used for sanitary ware which bodies can be fired at such temperatures 1100 to 1300° C. that easily allow to acquire in a single firing the degree of freedom in design based on the coloring and patterns brought forth by the glaze layer, and which bodies can also display sufficient mechanical strengths.

As for the ironstone bodies and vitrifiable bodies, however, when these bodies are fired to shrink to such an extent that a satisfactory mechanical strength is displayed, the shrinkage when fired becomes large and the deformation when fired also becomes great.

Accordingly, it is difficult to design accurately the dimension and shape of a product after being subjected to firing, and hence there are restrictions on the degree of freedom in giving design qualities and functionalities relying on shape.

In addition, depending on the shape of a product, the shrinkage and deformation cause generation of cracks, unevenness in shape, and degradation in dimensional accuracy, and hence sometimes become a source for lowering the process yield.

Furthermore, molded bodies being large in volume, thereby the setting efficiency gets worse, and the productivity cannot be said to be sufficiently satisfactory.

Accordingly, the object of the present invention is to provide the sanitary ware for which it is possible to accurately design the shape and dimension of a product after being subjected to firing while maintaining the mechanical strength required to sanitary ware, degradation of the process yield caused by shrinkage and deformation scarcely occurs, and the setting efficiency and productivity are improved as compared to the prior art.

DISCLOSURE OF THE INVENTION

The present invention provides, for the purpose of solving the above described problems, the sanitary ware, which is formed of a ceramic body with a glaze layer formed on the desired portions of the body, characterized in that the body is the one containing a crystal phase mainly composed of mullite and quartz, a glass phase mainly composed of $SiO_2$ and $Al_2O_3$, and a crystal phase comprising those minerals selected according to need from cristobalite, andalusite, sillimanite, kyanite, and corundum; the main components of the body are 50 to 65 wt % $SiO_2$, 30 to 45 wt % $Al_2O_3$, 0.1 to 2 wt % alkali oxides, and 0.1 to 10 wt % divalent metal oxides, the divalent metal oxide component containing at least the CaO component; and the CaO component segregation portions where the CaO component is segregated are dispersed in the body.

Since the CaO component segregation portions where the CaO component is segregated are dispersed, it becomes possible to provide the sanitary ware for which the firing shrinkage is sufficiently small while maintaining the mechanical strength required to sanitary ware, so that it is possible to accurately design the shape and dimension of a product after being subjected to firing; and the degradation of the process yield caused by shrinkage and deformation scarcely occurs, and the setting efficiency and productivity are satisfactory.

The reason for the above description can be interpreted as follows. Since the CaO component segregation portions where the CaO component is segregated are dispersed, the shrinkage caused by sintering of the liquid phase is suppressed in the segregation portions, and hence the firing shrinkage is suppressed. Furthermore, owing to the presence of the CaO component segregation portions which portions are different in such mechanical properties as Young's modulus and the like, the crack deflection effect takes place, and consequently the mechanical strength can take a sufficient value.

In the preferred embodiments of the present invention, the above described crystal phase is dispersed in the above described glass phase, and the composition ratio of the glass phase to the body is smaller than 60 wt %.

By suppressing the glass phase ratio to be smaller than 60 wt %, the large shrinkage following the liquid phase sintering is suppressed, and accordingly the firing shrinkage can be suppressed to be 6% or below.

In the preferred embodiments of the present invention, the relationships between the abundance ratios of Ca to Na, K, and Mg (in weight ratios) in the CaO component segregation portion are made to satisfy all the relations, Ca>Na, Ca>K, and Ca>Mg.

Accordingly, the components in the CaO component segregation portion are largely different from the components in the glass phase, so that the effect due to the dispersion of the CaO component segregation portions is accentuated.

In the preferred embodiments of the present invention, the content of the CaO component in the body is made to be 1 wt % or above.

By making the content of the CaO component to be 1 wt % or above, an excellent ratio of the bulk specific gravity to the strength can be obtained. This is interpreted to be ascribable to the observation that when the CaO component is abundant, the shrinkage in the glass phase following the liquid phase sintering is suppressed to be small.

In the preferred embodiments of the present invention, the relationships between the CaO component and the other divalent metal oxide components in the above described body are made to satisfy the condition that in relation to 100 parts by weight of CaO, the other divalent metal oxides are 50 parts by weight or below.

Consequently, an excellent ratio of the bulk specific gravity to the strength can be obtained. This is interpreted to be ascribable to the observation that when the CaO component is abundant, the shrinkage in the glass phase following the liquid phase sintering is suppressed to be small.

In the preferred embodiments of the present invention, the content of quartz in the body is made to be 20 wt % or below.

Consequently, it becomes possible to suppress the excessive increase in the thermal expansion coefficient of the body, and hence the cracks are scarcely caused to occur in such products large in size and complex in structure as sanitary ware during the temperature decrease process in firing.

In the preferred embodiments of the present invention, when corundum is contained in the body, the content of corundum is made to be 20 wt % or below.

Since corundum has a high Young's modulus, by uniformly dispersing corundum, a large effect of improving the strength can be obtained.

When corundum is contained in the body, it is preferable to make the corundum content be 20 wt % or below. The specific gravity of corundum is larger than the other minerals and glass phase, and hence when the body contains more than 20 wt % of corundum, the specific gravity of the body becomes heavy, resulting in an increase in cost when processing the bodies.

The present invention provides the sanitary ware which can be produced by the method comprising the process for molding the body raw material, the process for applying glaze, according to need, onto the desired portions, and the process for firing at the temperatures 1100 to 1300° C., and which are characterized in that the body raw material contains a clay mineral, quartz, a raw material containing alkali metals, and a raw material containing divalent metals; the clay mineral is a mineral which contains at least one mineral selected from kaolinite, dickite, halloysite, sericite, and pyrophyllite; the raw material containing divalent metals contains at least one mineral of wallastonite, limestone, and anorthite; the content of quartz is 30 wt % or below in relation to the body raw material; the content of the clay mineral material is 30 to 90 wt % in relation to the body raw material; and the body raw material is controlled in size so that the average grain size based on a laser diffraction grain size analyzer is 3 to 10 μm.

The use of at least one of wallastonite, limestone, and anorthite as a body raw material for use in introducing CaO, makes the CaO component segregation portions tend to be easily formed in a fired body, since in these materials the CaO component does not form solid solutions or compounds with such components as MgO, $Na_2O$, $K_2O$, and the like.

Accordingly, it becomes possible to provide the sanitary ware for which it is possible to accurately design the shape and dimension of a product after being subjected to firing while maintaining the mechanical strength required to sanitary ware with firing shrinkage sufficiently small, degradation of the process yield caused by shrinkage and deformation scarcely occurs, and the setting efficiency and productivity are improved as compared to the prior art.

The present invention provides the sanitary ware which can be produced by the method comprising the process for molding the body raw material, the process for applying glaze, according to need, onto the desired portions, and the process for firing at the temperatures 1100 to 1300° C., and which are characterized in that the body raw material contains a clay mineral, quartz, a raw material containing alkali metal oxides, a raw material containing divalent metal oxides, and a raw material small in ignition loss; the clay mineral is a mineral which contains at least one mineral selected from kaolinite, dickite, halloysite, sericite, and pyrophyllite; the content of quartz is 30 wt % or below in relation to the body raw material; the content of the clay mineral is 30 to 90 wt % in relation to the body raw material; the content of the raw material small in ignition loss is 5 to 50 wt % in relation to the body raw material; and the body raw material is controlled in size so that the average grain size based on a laser diffraction grain size analyzer is 3 to 10 μm.

The inclusion of the raw material small in ignition loss serves to reduce the firing shrinkage based on the ignition loss.

In the preferred embodiments of the present invention, the raw material containing divalent metals is made to contain at least one mineral of wallastonite, limestone, and anorthite.

The firing shrinkage is further reduced to yield an excellent strength through the multiplier effect between the effect of the use of a raw material small in ignition loss and the effect of the use of at least one mineral of wallastonite, limestone, and anorthite as a body raw material for use in introducing CaO.

In the preferred embodiments of the present invention, the raw material small in ignition loss is chamotte, and the main components of chamotte are each at least one mineral selected from mullite, cristobalite, quartz, and corundum, and the content of CaO in chamotte is set to be 1 wt % or above.

Through using a crystalline chamotte having the content of CaO of 1 wt % or above, the mechanical strength is improved by the crack deflection action, and the firing shrinkage rate becomes able to be reduced owing to the reduction in the content ratio of the glass phase.

In the preferred embodiments of the present invention, the raw material small in ignition loss is a hollow glass in which $SiO_2$ and $Al_2O_3$ are the main components.

Accordingly, the pores in a hollow glass remain as closed pores in a body, and hence a body can be obtained which has a small bulk density for its strength.

In the preferred embodiments of the present invention, the raw material small in ignition loss is the one selected from shirasu-balloon, expanded perlite, and expanded shale.

Accordingly, the pores in the hollow glass remain as enclosed pores in a body, and hence a body can be obtained which is small in bulk density for its strength.

In the preferred embodiments of the present invention, the bulk density (Db) of the above described body is 1.6 to 2.1 g/$Cm^3$, and the relationship between the bulk density and the bending strength (Sb) of the body is made to be such that Sb>60×Db−60 (MPa).

Consequently, the balance between the weight reduction and the mechanical strength can be maintained in a practical level for sanitary ware.

The present invention provides the sanitary ware which is made of a ceramic body and a glaze layer formed on the desired portions thereof, and can be produced by the method comprising the process for molding the body raw material, the process for applying glaze, according to need, onto the desired portions, and the process for firing at the temperatures 1100 to 1300° C., and which is characterized in that the firing shrinkage rate along the lengthwise direction in the firing process is 6% or below; the softening deformation of the body in the firing process is 10 mm or below; the bulk density (Db) of the body is 1.6 to 2.1 g/$cm^3$; and the relationship between the bulk density and the bending strength (Sb) of the body is such that Sb>60×Db−60 (MPa).

Consequently, the balance between the weight reduction and the mechanical strength and a degree of freedom in design can be maintained in a practical level for sanitary ware.

In the preferred embodiments of the present invention, the glaze layer is formed with such a glaze that gives a glaze layer smaller by 0 to $30\times10^{-7}/°$ C. in thermal expansion coefficient than the body.

By forming a glaze layer on the surface of a body, which layer is smaller by 0 to $30\times10^{-7}/°$ C. in thermal expansion coefficient than the body, the minute cracks due to aging on the surface of the glaze layer get to scarcely occur.

In the preferred embodiments of the present invention, the glaze layer of a transparent glaze is formed on the surface of the ceramic body.

Accordingly, the surface design quality is improved and adhesion of dirt onto the surface of the glaze layer is impeded, improving the resistance to dirt adhesion.

In the preferred embodiments of the present invention, a glaze layer of a coloring glaze is formed on the surface of the ceramic body, and furthermore, a surface glaze layer of a transparent glaze is formed thereon.

Consequently, the quality of surface design is improved, and adhesion of dirt onto the surface of the glaze layer is impeded, improving the resistance to dirt adhesion. In addition, the minute cracks due to aging on the surface of the glaze layer get to scarcely occur.

In the preferred embodiments of the present invention, engobe is formed on the surface of the ceramic body, and a glaze layer of the coloring glaze is formed thereon.

Consequently, the minute cracks due to aging on the surface of the glaze layer become to scarcely occur.

In the preferred embodiments of the present invention, engobe is formed on the surface of the ceramic body, and a glaze layer of the transparent glaze is formed thereon.

Consequently, the surface design quality is improved, and adhesion of dirt onto the surface of the glaze layer is impeded, improving the resistance to dirt adhesion. In addition, the minute cracks on the surface of the glaze layer due to aging get to scarcely occur.

In the preferred embodiments of the present invention, engobe is formed on the surface of the ceramic body, and a glaze layer of the coloring glaze is formed thereon, and furthermore, a glaze layer of the transparent glaze is formed thereon.

Consequently, the surface design quality is improved, adhesion of dirt onto the surface of the glaze layer is impeded, improving the resistance to dirt adhesion. In addition, the minute cracks on the surface of the glaze layer due to aging get to scarcely occur.

In the preferred embodiments of the present invention, the surface roughness Ra of the surface of the transparent glaze layer is made to be 100 nm or below, and preferably 70 nm or below, and more preferably 40 nm or below, as measured with a stylus-type surface roughness analyzer (JIS-B0651).

Consequently, adhesion of dirt onto the surface of the glaze layer is impeded, improving the resistance to dirt adhesion. In addition, the minute cracks on the surface of the glaze layer due to aging get to scarcely occur.

In the preferred embodiments of the present invention, the engobe formed between the body surface and the coloring glaze layer is made to be a fine layer smaller in porosity than the body.

Accordingly, the engobe gets to acquire the blocking function to prevent the gas generated in the body from passing through the glaze layer to grow as pinholes, and hence the poor exterior appearance such as speckles gets to be scarcely invited, and simultaneously the flatness and smoothness of the glaze layer surface is prevented from being deteriorated by the effect of the gas. In addition, the minute cracks due to aging on the glaze layer surface get to scarcely occur.

In the preferred embodiments of the present invention, a powder raw material having a 50% grain size (D50) of 6 $\mu$m or below is used as the raw material for forming the engobe.

Accordingly, the engobe gets to easily form a fine layer smaller in porosity than the body layer, and to easily acquire the function to block the gas generated from the body.

In the preferred embodiments of the present invention, the raw material for use in forming the engobe has the composition of 30 to 50 wt % pottery stone, 30 to 50 wt % clay, and 10 to 30 wt % flux.

Consequently, the engobe tends to easily have a properly vitrified state and a properly sintered state, and gets to acquire stably the function to block the gas from the body.

In the preferred embodiments of the present invention, the thermal expansion coefficient of the body is 50 to $90\times10^{-7}$ (/° C.) (50 to 600° C.).

By making the thermal expansion coefficient to be $90\times10^{-7}$ (/° C.) or below, cracking gets to scarcely occur in such products large in size and complex in structure as sanitary ware during the temperature decrease process in firing.

In addition, by making the thermal expansion coefficient to be $50\times10^{-7}$ (/° C.) or above, it becomes possible to acquire a degree of freedom in designing glaze layer under the condition that cracking and the like scarcely occur.

In the preferred embodiments of the present invention, the molding method adopted is the slip casting method.

Accordingly, large-sized and complex sanitary ware can be easily produced at a low cost.

BEST MODE FOR CARRYING OUT THE INVENTION

At the beginning, description will be made below on the main technical terms used in the present invention.

Crystal Phase:

In the present invention, the crystal phase means a portion which is a particular mineral and has a regular diffraction pattern in X-ray analysis. The content of a crystal phase is determined with the internal standard method from the calibration curves obtained for the individual crystal phases on the basis of the respective standard substances, and is given in weight ratios.

Glass Phase:

In the present invention, the glass phase means the portion other than the crystal portion which does not show any regular pattern in X-ray analysis.

Ratio of the Glass Phase in a Body:

In the present invention, the ratio of the glass in a body is defined as the weight ratio of the glass phase to the whole body, and specifically, refers to the amount left by subtracting the crystal phase weight determined with X-ray analysis from the weight of the whole body.

Body Components:

Ceramic components include oxides and solid solutions of a plurality of metallic species such as composite oxide crystals as represented by mullite and glass phases, and these components are given in the weight ratios as determined on the basis of the weights reduced to the individual single component metal oxides determined by the fluorescent X-ray analysis method.

CaO Component Segregation Portion:

On the basis of the results obtained by the element analysis with EPMA, a portion which is higher in the concentration of Ca than the surrounding portions is defined as a CaO component segregation portion. When each CaO segregation portions is, for the concentrations of Mg, Na, and K, not largely different from or rather lower than the surrounding portions on the basis of the element analysis with EPMA, the states of the CaO segregation portions are preferable for decreasing the firing shrinkage.

Dispersion of the CaO Component Segregation Portions:

The term "dispersion" means a state where the regions concerned are not concentrated in a particular location, but are present in a lot of locations. Through being in such a state, the crack deflection effect becomes to be effectively displayed.

Bulk Density of a Body:

The bulk density of a body is measured by Archimedes' method. A test piece (a piece of fired body) of 25 mm in width, 5 mm in thickness, and 20 mm in length is dried at 105° C. for 24 hours, and subsequently cooled to room temperature in such a environment that the test piece does not take up moisture, and then the mass W1 is measured. Then, the test piece is allowed to stand in a vacuum for 1 hour to release the air bubbles. Furthermore, in the same environment the test piece is kept in water for 1 hour and then made to get back to room temperature. Then, the mass of the test piece is measured while being hung freely in the water with a thin thread to give the mass W2. Subsequently, the test piece is taken out of the water, and immediately after the waterdrops on the surface thereof are wiped off quickly with a piece of wet and wrung cloth, the mass thereof is measured to give the mass W3. The bulk density is obtained from the density of water, W1, W2, and W3, on the basis of the following equation:

$$\text{Bulk density} = (\text{density of water}) \times W1/(W3-W2)$$

Bending Strength of a Body:

The bending strength of a body is measured on a fired test piece of $\phi 13 \times 130$ mm, under the conditions that the span is 100 mm and the cross head speed is 2.5 mm/min, by use of the three-point bending method.

Firing Shrinkage Rate of a Body:

A mark of 150 mm in length is inscribed on a green test piece of 30 mm in width, 15 mm in thickness, and 260 mm in length. Then, the length variation in the inscribed mark found after firing is divided by 150 mm to give the firing shrinkage rate in percents.

Softening Deformation of a Body:

A green test piece of 30 mm in width, 15 mm in thickness, and 260 mm in length is fired in a state of being supported with a span of 200 mm, and subsequently the bending in the central portion of the test piece and the thickness of the test piece are measured. Since the bending thus obtained is inversely proportional to the square of the test piece thickness, the bending reduced to the thickness of 10 mm, on the basis of the following equation, is defined as the softening deformation of the body:

$$\text{Softening deformation of body} = \text{measured bending value} \times (\text{test piece thickness after firing})^2/10^2$$

Thermal Expansion Coefficient of a Body:

For the measurement of the thermal expansion of a body, a fired test piece of 5 mm in diameter and 20 mm in length is used. The thermal expansion coefficient is shown as the linear thermal expansion coefficient measured using a differential expansion monitor on the basis of the compressive load method over the temperature range 50 to 600° C.

The Impact Strength of a Body:

The impact strength of a body is measured using a Charpy tester with a sintered $\phi 13 \times 130$ mm test piece.

Thermal Shock Resistance of a Body:

The thermal shock resistance of a body is represented as the maximum temperature difference for which no cracks are formed when a test piece of width $25 \times$ thickness $10 \times$ length 110 mm is maintained at a prescribed temperature for 1 hour and more then thrown into water to be cooled abruptly and examined as to whether cracks are formed.

Now, description will be made below on an example of the production method of sanitary ware of the present invention.

Body Raw Material:

For the starting raw material, the clay minerals and a raw material containing Ca are indispensable components, and in addition, quartz, raw materials containing alkali metals, and a raw material small in ignition loss may be added to the starting material.

The above described raw materials are mixed together, and according to need, pulverized using a ball mill or the like to obtain a body raw material.

The average grain size of the body raw material measured with a laser diffraction grain size analyzer is preferably adjusted to be 3 to 10 $\mu$m.

When the casting method is used in a later process, the body raw material is dispersed in water and used as a suspension. Dispersants, antiseptic agents, adhesive pastes, antibacterial agents may be added to the suspension.

As the clay minerals, kaolinite, dickite, halloysite, sericite, and pyrophyllite can be suitably used.

As the raw materials containing alkali metals, sericite, feldspar, and nepheline can be suitably used.

As the raw materials containing Ca, limestone and wollastonite can be suitably used.

As for contents of the individual raw materials, the clay mineral is used preferably in 30 to 90 parts by weight, and the raw material containing Ca is used preferably in 1 to 15 parts by weight. The raw material containing alkali metals can be used within the range where the total amount of alkali metal oxides does not exceed 2 wt % in relation to the whole body. In addition, when a quartz raw material is used, the content thereof is preferably 30 parts by weight or below. When a raw material small in ignition loss is used, it is preferably used within the range from 5 to 50 parts by weight.

Production Method:

The body raw material is molded by the casting method, demolded, dried, and subsequently a glaze is applied onto the desired portions, and then fired.

Plaster molds, resin molds, and the like can be used as casting molds, and pressurization, vacuum suction, mold suction, head pressure are all can be used as the methods for application of pressure.

Drying can be performed, for example, at room temperature to a temperature of the order of 110° C.

For application of glaze, there can be used such methods as wet spray, dry spray, "other exemplified methods," and the like can be used.

For glaze, there can be used natural raw materials such as feldspar, quartz, limestone, and the like, and amorphous raw materials and the like such as frit glaze and the like to which materials pigments and emulsifiers are added. The glaze is preferably smaller in thermal expansion coefficient than the body by 0 to $30 \times 10^{-7}/°$ C.

The transparent glaze raw material means mixtures of natural grains of silica sand, feldspar, limestone, and the like, and/or amorphous glazes such as frit glaze, and the like, and the coloring glaze raw material means a raw material which is prepared by adding emulsifiers and/or pigments to a transparent glaze raw material.

In one embodiment of glaze application, engobe is formed on the ceramic body, the coloring glaze layer is formed thereover, and furthermore, a transparent glaze layer is formed thereover.

As engobe, there can be suitably used such mixtures as composed of natural interval grains of pottery stone, clay, feldspar, and the like.

In the coloring glaze layer, the main component is composed of amorphous components, and in addition such crystalline components as emulsifier, pigments, and the like are contained in small amounts. The amorphous components comprises the tetravalent metal oxide components such as $SiO_2$ and the like, the trivalent metal oxide components such as $Al_2O_3$ and the like, the divalent metal oxides such as CaO, MgO, ZnO, and the like, and the monovalent metal oxide components such as $Na_2O$, $K_2O$, $Li_2O$, and the like, and among these components, the MgO component is contained in 2.5 to 4.4 wt % and the $Al_2O_3$ component is contained in 9.3 to 15.1 wt %. The preferable contents of the other components are 55 to 80 wt % for $SiO_2$, 8 to 17 wt % for CaO, 3 to 10 wt % for ZnO, 1 to 4 wt % for $K_2O$, and 0.5 to 2.5 wt % for $Na_2O$.

In the transparent glaze layer, the main component is composed of amorphous components, and in addition such crystalline components as emulsifier, pigments, and the like are contained in small amounts. The amorphous components comprises the tetravalent metal oxide components such as $SiO_2$ and the like, the trivalent metal oxide components such as $Al_2O_3$ and the like, the divalent metal oxides components such as CaO, MgO, ZnO, and the like, and the monovalent metal oxide components such as $Na_2O$, $K_2O$, $Li_2O$, and the like, and among these components, the MgO component is contained in 0 to 4.4 wt %. The preferable contents of the other components are 55 to 80 wt % for $SiO_2$, 7 to 17 wt % for CaO, 3 to 15 wt % for ZnO, 1 to 4 wt % for $K_2O$, and 0.5 to 2.5 wt % for $Na_2O$.

Incidentally, any of the following materials is preferably used as the raw material for the transparent glaze, since the surface roughness thereby obtained easily tends to be 100 nm or below.

(1) Amorphous raw material.

(2) A composite composed of 1 part by weight of a mixture of a natural mineral mixture composed of silica sand, feldspar, limestone, and the like, and 1 to 100 parts by weight of an amorphous material.

(3) A mixture composed of fine natural minerals in which the 50% grain size as measured with a laser diffraction grain size analyzer is smaller than 6 μm.

The firing can be performed at the temperatures of 1100 to 1300° C. For the purpose of firing, either of a continuous firing furnace and a batch furnace can be used.

Embodiments

Description will be made below on the embodiments of the present invention on the basis of the attached drawings. Table 1 shows the raw materials used in the embodiments, and the chemical compositions and main minerals thereof. Tables 2 to 7 show the raw materials for the bodies associated with the comparative examples and the present invention, the contents of the minerals contained in the raw materials, the compositions and physical properties of the bodies, and the like.

TABLE 1

Chemical compositions and mineral contents in raw materials used (wt %)

| Raw material | $SiO_2$ | $Al_2O_3$ | $TiO_2$ | $Fe_2O_3$ | CaO | MgO | $Na_2O$ | $K_2O$ | Ig. Loss | Minerals contained[1] |
|---|---|---|---|---|---|---|---|---|---|---|
| Pottery stone | 75.0 | 18.1 | 0.13 | 0.38 | 0.17 | 0.02 | — | 0.17 | 6.10 | Kaoline minerals[2] 45, quartz 55 |
| Wax stone | 70.2 | 24.2 | 0.56 | 0.13 | 0.18 | 0.02 | 0.03 | 0 | 4.62 | Pyrophyllite 79.2, quartz 20.8 |
| Kaoline | 48.1 | 36.4 | 0.20 | 0.80 | 0.20 | 0.30 | 0.10 | 2.20 | 11.8 | Kaoline minerals[2] 73, sericite 25 |
| Sericite | 46.69 | 37.56 | 0.63 | 0.35 | 0.31 | 0.18 | 1.14 | 8.3 | 4.84 | Sericite 99 |
| Clay | 53.5 | 29.9 | 1.20 | 1.00 | 0.30 | 0.40 | 0.20 | 2.10 | 11.6 | Kaoline minerals[2] 76, quartz 13 |
| Silica sand | 96.5 | 1.5 | 0.04 | 0.08 | 0.15 | 0.04 | | 1.04 | 0.7 | Quartz 93 |
| Fired alum shale A | 7.50 | 85.7 | 3.30 | 1.40 | 0.30 | 0.20 | — | 0.20 | 1.50 | Corundum 80, mullite 10 |
| Fired alum shale B | 36.16 | 59.82 | 3.04 | 1.5 | 0.25 | 0.14 | 0.04 | 0.3 | 0.31 | Corundum 33.2, mullite 44.8 |
| Chamotte A | 52.24 | 43.2 | 2.09 | 1.61 | 0.21 | 0.38 | 0.06 | 0.48 | | Mullite 63, cristobalite |
| Chamotte B | 52.7 | 40.51 | 0.19 | 2.39 | 2.42 | 0.48 | 0.42 | 0.83 | 0.09 | Mullite 46.1 |
| Chamotte C | 45.62 | 52.54 | 0.92 | 0.51 | 0.24 | 0.07 | 0 | 0 | 0.09 | Mullite 65.4, cristobalite |
| Feldspar | 56.1 | 25.2 | 0.20 | 0.10 | 1.10 | — | 7.70 | 8.80 | 0.90 | Quartz 30 |
| Dolomite | 2.50 | — | — | 0.10 | 32.3 | 19.5 | — | — | 45.5 | Dolomite 84, calcite 16 |
| Limestone | 0.04 | 0 | 0 | 0.01 | 55.5 | 0.3 | 0 | 0 | 43.7 | Calcite 98, dolomite 2 |
| Wollastonite | 51 | 0.02 | 0.07 | 0.17 | 46.1 | 0.99 | 0.01 | 0.01 | 1.05 | Wollastonite 99 |

[1]Trace minerals and glass-like substances are excluded.
[2]Kaolinite, halloysite, dickite, etc.

TABLE 2

Comparison with the conventional technology (for sanitary wares)

| Body No. | | | 1-1 | 1-2 | 1-3 | 1-4 | 1-5 |
|---|---|---|---|---|---|---|---|
| Raw materials used (○; Present) | Pottery stone A | | ○ | | ○ | ○ | ○ |
| | Wax stone | | — | | — | — | — |
| | Kaoline | | ○ | ○ | ○ | ○ | ○ |
| | Sericite | | ○ | | | — | |
| | Clay | | ○ | ○ | ○ | ○ | ○ |
| | Silica sand | | | ○ | — | — | |
| | Chamotte A | | — | ○ | — | — | |
| | Chamotte B | | — | | | — | — |
| | Chamotte C | | — | | | — | |
| | Fired alum shale A | | | — | — | — | |
| | Fired alum shale B | | | — | — | — | |
| | Feldspar | | ○ | — | ○ | — | — |
| | Dolomite | | ○ | | — | — | — |
| | Limestone | | — | — | — | — | — |
| | Wollastonite | | — | — | — | — | ○ |
| Main minerals in body raw materials (wt %) | Clay minerals | Kaoline minerals | 28.3 | 36.6 | 36.9 | 73.7 | 66.2 |
| | | Sericite | 19.6 | 5.5 | 21.1 | 4.6 | 7.8 |
| | | Pyrophyllite | 2.2 | — | 1.2 | 1.5 | 2.9 |
| | Quartz | | 35.6 | 21.9 | 28.7 | 18.7 | 18.5 |
| | Cristobalite | | | ○ | — | — | |
| | Corundum | | | — | — | — | |
| | Mullite | | | 14.8 | — | — | |
| Average grain size of raw material (μm) | | | 8 | 17.3 | 8.5 | 6 | 6.04 |
| Firing temperature (° C.) | | | 1200 | 1200 | 1200 | 1200 | 1200 |
| Body composition (wt %) | Chemical Composition of body | $SiO_2$ | 72.5 | 64.1 | 68.4 | 62.8 | 62.8 |
| | | $Al_2O_3$ | 19.8 | 32.1 | 24.6 | 34.8 | 33 |
| | | $Na_2O$ | 1.15 | 0.03 | 0.55 | 0.01 | 0.022 |
| | | $K_2O$ | 3.32 | 1.22 | 3.62 | 0.91 | 1.2 |
| | | MgO | 0.75 | 0.29 | 0.15 | 0.15 | 0.17 |
| | | CaO | 1.1 | 0.22 | 0.23 | 0.25 | 1.77 |
| | | Others | 1.38 | 2.04 | 2.45 | 1.08 | 1.038 |
| | Alkali metal oxides (total) | | 4.47 | 1.25 | 4.17 | 0.92 | 1.22 |
| | Alkali earth metal oxides (total) | | 1.9 | 0.5 | 0.4 | 0.4 | 1.9 |
| | Minerals contained | Corundum | 0 | 0 | 0 | 0 | 0 |
| | | Mullite | 13.5 | 15.6 | 16.8 | 19.3 | 18.6 |
| | | Quartz | 13.3 | 20.4 | 11 | 18.6 | 14.8 |
| | | Cristobalite | 0 | ○ | 0 | 3.5 | 14.5 |
| | Crsyatl phase content | | 26.8 | | 27.8 | 41.4 | 47.9 |
| | Glass phase content | | 73.2 | | 72.2 | 58.6 | 52.1 |
| Body physical properties | Drying shrinkage rate (%) | | 3.5 | 2.1 | 3.2 | 2.17 | 2.02 |
| | Firing shrinkage rate (%) | | 9.8 | 2.4 | 8.2 | 4.5 | 4.1 |
| | Total shrinkage rate (%) | | 13.0 | 4.4 | 11.1 | 6.6 | 6.0 |
| | Firing bending (mm) | | 32 | 2.8 | 19.5 | 3.9 | 4.2 |
| | Bending strength (Mpa) | | 82 | 39 | 61 | 43.2 | 60.3 |
| | Impact strength ($J/cm^2$) | | 0.27 | 0.29 | 0.26 | 0.27 | 0.29 |
| | Therm. expan. coeff. $\times 10^{-7}$ (/° C.) | | 73 | 74.9 | 67 | 66.4 | 78.8 |
| | Therm. shock resist. ΔT (° C.) | | 130 | 140 | 120 | 140 | 140 |
| | Water absorbing rate (%) | | 0.1 | 13.8 | 5.5 | 16.9 | 16.6 |
| | Apparent density ($g/cm^3$) | | 2.63 | 2.65 | 2.64 | 2.69 | 2.7 |
| | Bulk density ($g/cm^3$) | | 2.39 | 1.94 | 2.17 | 1.84 | 1.81 |

TABLE 3

| Body No. | | 2-1 | 2-2 | 2-3 | 2-4 | 2-5 | 2-6 |
|---|---|---|---|---|---|---|---|
| Raw materials used (○; Present) | Pottery stone A | ○ | ○ | ○ | ○ | ○ | ○ |
| | Wax stone | — | — | — | — | — | — |
| | Kaoline | ○ | ○ | ○ | ○ | ○ | ○ |
| | Sericite | ○ | ○ | ○ | ○ | ○ | ○ |
| | Clay | ○ | ○ | ○ | ○ | ○ | ○ |
| | Silica sand | | — | — | | — | — |
| | Chamotte A | — | — | — | — | — | — |
| | Chamotte B | ○ | — | ○ | — | — | — |
| | Chamotte C | — | | | ○ | — | — |
| | Fired alum shale A | | — | — | — | ○ | — |
| | Fired alum shale B | | — | — | — | — | ○ |
| | Feldspar | — | — | — | — | — | — |
| | Dolomite | — | — | — | — | — | — |
| | Limestone | — | ○ | ○ | ○ | ○ | ○ |
| | Wollastonite | — | — | ○ | ○ | ○ | ○ |

TABLE 3-continued

| | | Body No. | 2-1 | 2-2 | 2-3 | 2-4 | 2-5 | 2-6 |
|---|---|---|---|---|---|---|---|---|
| Main minerals in body raw materials (wt %) | Clay minerals | Kaoline minerals | 48.8 | 54.6 | 44.8 | 51.5 | 51.51 | 51.51 |
| | | Sericite | 7.5 | 7.8 | 5.7 | 5 | 5 | 5 |
| | | Pyrophyllite | 2.5 | 2.9 | 0.3 | 1.6 | 1.55 | 1.55 |
| | Quartz | | 18.7 | 18.5 | 11.8 | 14.9 | 14.64 | 14.64 |
| | Cristobalite | | — | — | — | ○ | — | — |
| | Corundum | | — | — | — | 0.6 | 16 | 4.14 |
| | Mullite | | 9.2 | — | 9.2 | 13.1 | 4 | 8.96 |
| Average grain size of raw material (μm) | | | 6 | 6 | 6.1 | 6.01 | 5.86 | 6.01 |
| Firing temperature (° C.) | | | 1200 | 1200 | 1200 | 1200 | 1200 | 1200 |
| Body composition (wt %) | Chemical Composition of body | $SiO_2$ | 62.6 | 62 | 58 | 58.1 | 50.2 | 56.0 |
| | | $Al_2O_3$ | 33.8 | 33.4 | 35 | 36.2 | 43.4 | 37.8 |
| | | $Na_2O$ | 0.19 | 0.02 | 0.2 | 0.01 | 0.02 | 0.02 |
| | | $K_2O$ | 1.08 | 1.21 | 1.06 | 0.82 | 0.87 | 0.88 |
| | | MgO | 0.22 | 0.15 | 0.29 | 0.16 | 0.18 | 0.19 |
| | | CaO | 0.71 | 2.11 | 4.05 | 3.58 | 3.59 | 3.59 |
| | | Others | 1.4 | 1.11 | 1.4 | 1.18 | 1.74 | 1.51 |
| | Alkali metal oxides (total) | | 1.27 | 1.23 | 1.26 | 0.83 | 0.89 | 0.90 |
| | Alkali earth metal oxides (total) | | 0.9 | 2.3 | 4.3 | 3.7 | 3.8 | 3.8 |
| | Minerals contained | Corundum | 0 | 0 | 0 | 0 | 15.5 | 5.5 |
| | | Mullite | 25.9 | 19 | 19.1 | 24.9 | 18.5 | 26.7 |
| | | Quartz | 11.7 | 14.4 | 6.1 | 14.2 | 13.8 | 14.1 |
| | | Cristobalite | 19 | 10.1 | 15.5 | ○ | ○ | ○ |
| | Crystal phase content | | 56.6 | 43.5 | 40.7 | — | — | — |
| | Glass phase content | | 43.4 | 56.5 | 59.3 | — | — | — |
| Body physical properties | Drying shrinkage rate (%) | | 2.4 | 2.4 | 2.1 | 1.9 | 2.2 | 2.0 |
| | Firing shrinkage rate (%) | | 4.1 | 4.5 | 2.9 | 2.2 | 2.4 | 2.4 |
| | Total shrinkage rate (%) | | 6.4 | 6.8 | 4.9 | 4.1 | 4.6 | 4.4 |
| | Firing bending (mm) | | 5.6 | 4.4 | 4.7 | 4.8 | 4.6 | 4.7 |
| | Bending strength (Mpa) | | 64 | 57 | 55 | 41 | 51 | 55 |
| | Impact strength ($J/cm^2$) | | 0.32 | 0.3 | 0.32 | 0.32 | 0.32 | 0.33 |
| | Therm. expan. coeff. × $10^{-7}$ (/° C.) | | 78 | 73 | 65 | 74 | 71 | 72 |
| | Therm. shock resist. ΔT (° C.) | | 140 | 140 | 140 | 140 | 140 | 130 |
| | Water absorbing rate (%) | | 16.2 | 16.8 | 20.7 | 23.3 | 20.7 | 21.7 |
| | Apparent density ($g/cm^3$) | | 2.66 | 2.66 | 2.67 | 2.69 | 2.80 | 2.71 |
| | Bulk density ($g/cm^3$) | | 1.86 | 1.83 | 1.71 | 1.65 | 1.76 | 1.71 |

TABLE 4

| | | Body No. | 2-7 | 2-8 | 2-9 | 2-10 |
|---|---|---|---|---|---|---|
| Raw materials used (○; Present) | Pottery stone A | | ○ | ○ | ○ | ○ |
| | Wax stone | | ○ | ○ | ○ | ○ |
| | Kaoline | | ○ | ○ | ○ | ○ |
| | Sericite | | — | ○ | ○ | ○ |
| | Clay | | ○ | ○ | ○ | ○ |
| | Silica sand | | — | — | — | — |
| | Chamotte A | | — | — | — | — |
| | Chamotte B | | ○ | ○ | ○ | ○ |
| | Chamotte C | | — | — | — | — |
| | Fired alum shale A | | ○ | ○ | ○ | ○ |
| | Fired alum shale B | | — | — | — | — |
| | Feldspar | | — | — | — | — |
| | Dolomite | | — | — | — | — |
| | Limestone | | ○ | ○ | ○ | ○ |
| | Wollastonite | | ○ | ○ | ○ | ○ |
| Main minerals in body raw materials (wt %) | Clay minerals | Kaoline minerals | 43.1 | 47.1 | 38.4 | 42.6 |
| | | Sericite | 2.5 | 2.5 | 8.2 | 7.2 |
| | | Pyrophyllite | 12.3 | 12.8 | 11.5 | 12.1 |
| | Quartz | | 14.6 | 10.1 | 14.5 | 10.7 |
| | Cristobalite | | — | — | — | — |
| | Corundum | | 4 | 4 | 4 | 4 |
| | Mullite | | 7.9 | 7.9 | 7.9 | 7.9 |
| Average grain size of raw material (μm) | | | 6 | 5.8 | 6 | 5.9 |
| Firing temperature (° C.) | | | 1200 | 1200 | 1200 | 1200 |
| Body composition (wt %) | Chemical Composition of body | $SiO_2$ | 58.8 | 56.4 | 58.2 | 56.4 |
| | | $Al_2O_3$ | 34.9 | 37.1 | 34.9 | 36.7 |
| | | $Na_2O$ | 0.15 | 0.15 | 0.21 | 0.2 |
| | | $K_2O$ | 0.65 | 0.69 | 0.14 | 1.08 |
| | | MgO | 0.22 | 0.23 | 0.23 | 0.24 |
| | | CaO | 3.92 | 3.97 | 3.9 | 3.91 |
| | | Others | 1.36 | 1.46 | 1.42 | 1.47 |

TABLE 4-continued

| | Body No. | | 2-7 | 2-8 | 2-9 | 2-10 |
|---|---|---|---|---|---|---|
| | Alkali metal oxides (total) | | 0.80 | 0.84 | 1.35 | 1.28 |
| | Alkali earth metal oxides (total) | | 4.1 | 4.2 | 4.1 | 4.2 |
| | Minerals contained | Corundum | 6.1 | 6.5 | 5.6 | 4.1 |
| | | Mullite | 20.3 | 19.5 | 17.2 | 21.1 |
| | | Quartz | 11.3 | 6.6 | 5.7 | 5.7 |
| | | Cristobalite | ○ | ○ | ○ | ○ |
| Body physical properties | Drying shrinkage rate (%) | | 2.1 | 2.3 | 2.3 | 2.2 |
| | Firing shrinkage rate (%) | | 1.7 | 2.2 | 3.5 | 3.3 |
| | Total shrinkage rate (%) | | 3.8 | 4.4 | 5.7 | 5.4 |
| | Firing bending (mm) | | 3 | 3.9 | 5.8 | 5.3 |
| | Bending strength (MPa) | | 49 | 50 | 71 | 67 |
| | Therm. expan. coeff. $\times 10^{-7}$ (/°C.) | | 74 | 69 | 63 | 61 |
| | Therm. shock resist. $\Delta T$ (°C.) | | 130 | 140 | 140 | 140 |
| | Water absorbing rate (%) | | 20.6 | 20.5 | 15.8 | 16.9 |
| | Apparent density (g/cm³) | | 2.69 | 2.71 | 2.7 | 2.7 |
| | Bulk density (g/cm³) | | 1.73 | 1.73 | 1.89 | 1.87 |
| Sanitary ware prototypes | Kiln crack | Stool | X | ○ | ○ | ○ |
| | | Stall urinal | ○ | ○ | ○ | ○ |
| | | Counter-integrated wash bowl | ○ | ○ | ○ | ○ |
| | | Wash bowl | ○ | ○ | ○ | ○ |
| | Abrupt heating test of wash bowl | | ○ | ○ | ○ | ○ |

TABLE 5

| | Body No. | | 3-1 | 3-2 | 3-3 |
|---|---|---|---|---|---|
| Raw materials used (○; Present) | Pottery stone A | | ○ | ○ | ○ |
| | Wax stone | | ○ | ○ | ○ |
| | Kaoline | | ○ | ○ | ○ |
| | Sericite | | — | — | — |
| | Clay | | ○ | ○ | ○ |
| | Silica sand | | — | — | — |
| | Chamotte A | | — | — | — |
| | Chamotte B | | ○ | ○ | ○ |
| | Chamotte C | | — | — | — |
| | Fired alum shale A | | ○ | ○ | ○ |
| | Fired alum shale B | | — | — | — |
| | Feldspar | | — | — | — |
| | Dolomite | | — | — | — |
| | Limestone | | — | — | — |
| | Wollastonite | | — | — | — |
| Main minerals in body raw materials (wt %) | Clay minerals | Kaoline minerals | 51 | 51 | 51 |
| | | Sericite | 3 | 3 | 3 |
| | | Pyrophyllite | 14.2 | 14.2 | 14.2 |
| | Quartz | | 10.5 | 10.5 | 10.5 |
| | Cristobalite | | — | — | — |
| | Corundum | | 4 | 4 | 4 |
| | Mullite | | 8.4 | 8.4 | 8.4 |
| Average grain size of raw material (μm) | | | 6.9 | 6.1 | 5.1 |
| Firing temperature (°C.) | | | 1200 | 1200 | 1200 |
| Body chemical composition of body (wt %) | Composition | SiO₂ | 58.1 | 58.1 | 58.1 |
| | | Al₂O₃ | 38.8 | 38.8 | 38.8 |
| | | Na₂O | 0.08 | 0.08 | 0.08 |
| | | K₂O | 0.82 | 0.82 | 0.82 |
| | | MgO | 0.21 | 0.21 | 0.21 |
| | | CaO | 0.4 | 0.4 | 0.4 |
| | | Others | 1.59 | 1.59 | 1.59 |
| | Alkali metal oxides (total) | | 0.90 | 0.90 | 0.90 |
| | Alkali earth metal oxides (total) | | 0.6 | 0.6 | 0.6 |
| | Minerals contained | Corundum | — | — | — |
| | | Mullite | — | — | — |
| | | Quartz | — | — | — |
| | | Cristobalite | — | — | — |
| Body physical properties | Drying shrinkage rate (%) | | 2.7 | 2.7 | 2.5 |
| | Firing shrinkage rate (%) | | 3.7 | 3.8 | 3.9 |
| | Total shrinkage rate (%) | | 6.3 | 6.4 | 6.3 |
| | Firing bending (mm) | | 4.5 | 4.3 | 3.4 |
| | Bending strength (MPa) | | 52 | 55 | 57 |
| | Therm. expan. coeff. $\times 10^{-7}$ (/°C.) | | 72 | 72 | 75 |
| | Therm. shock resist. $\Delta T$ (°C.) | | 130 | 120 | 120 |
| | Water absorbing rate (%) | | 16.5 | 16 | 15.8 |
| | Apparent density (g/cm³) | | 1.85 | 1.87 | 1.87 |
| | Bulk density (g/cm³) | | 2.71 | 2.71 | 2.71 |

TABLE 6

| | Body No. | 4-1 | 4-2 | 4-3 | 4-4 | 4-5 |
|---|---|---|---|---|---|---|
| Raw materials used (○; Present) | Pottery stone A | ○ | ○ | ○ | — | ○ |
| | Wax stone | ○ | ○ | ○ | ○ | ○ |
| | Kaoline | ○ | ○ | ○ | ○ | ○ |
| | Sericite | — | — | — | — | ○ |
| | Clay | ○ | ○ | ○ | ○ | ○ |
| | Silica sand | — | — | — | — | — |
| | Chamotte A | — | — | — | — | — |
| | Chamotte B | ○ | ○ | ○ | ○ | ○ |
| | Chamotte C | — | — | — | — | — |

TABLE 6-continued

|  |  |  | Body No. | 4-1 | 4-2 | 4-3 | 4-4 | 4-5 |
|---|---|---|---|---|---|---|---|---|
|  |  | Fired alum shale A |  | ○ | ○ | ○ | ○ | ○ |
|  |  | Fired alum shale B |  | — | — | — | — | — |
|  |  | Feldspar |  | — | — | — | — | — |
|  |  | Dolomite |  | — | — | — | — | — |
|  |  | Limestone |  | — | — | — | — | ○ |
|  |  | Wollastonite |  | — | — | — | — | ○ |
| Main minerals in body raw materials (wt %) | Clay minerals | Kaoline minerals |  | 43.5 | 42.1 | 51 | 47.6 | 38.4 |
|  |  | Sericite |  | 3 | 3 | 3 | 3 | 8.2 |
|  |  | Pyrophyllite |  | 12.5 | 15.4 | 14.2 | 16.2 | 11.5 |
|  | Quartz |  |  | 19.7 | 13.1 | 10.5 | 8 | 14.5 |
|  | Cristobalite |  |  | — | — | — | — | — |
|  | Corundum |  |  | 4 | 8 | 4 | 12 | 4 |
|  | Mullite |  |  | 8.4 | 9.4 | 8.4 | 8 | 7.9 |
| Average grain size of raw material ($\mu$m) |  |  |  | 5.9 | 6 | 6.1 | 6.1 | 6 |
| Firing temperature (° C.) |  |  |  | 1200 | 1200 | 1200 | 1200 | 1200 |
| Body composition (wt %) | Chemical Composition of body | $SiO_2$ |  | 62.4 | 56.7 | 58.1 | 51.2 | 58.2 |
|  |  | $Al_2O_3$ |  | 34.6 | 39.9 | 38.8 | 45.2 | 34.9 |
|  |  | $Na_2O$ |  | 0.08 | 0.09 | 0.08 | 0.08 | 0.21 |
|  |  | $K_2O$ |  | 0.93 | 0.82 | 0.82 | 0.86 | 1.14 |
|  |  | MgO |  | 0.19 | 0.2 | 0.21 | 0.18 | 0.23 |
|  |  | CaO |  | 0.35 | 0.4 | 0.4 | 0.38 | 3.9 |
|  |  | Others |  | 1.45 | 1.89 | 1.59 | 2.1 | 1.42 |
|  | Alkali metal oxides (total) |  |  | 1.01 | 0.91 | 0.90 | 0.94 | 1.35 |
|  | Alkali earth metal oxides (total) |  |  | 0.5 | 0.6 | 0.6 | 0.6 | 4.1 |
|  | Minerals contained | Corundum |  | 5.2 | 10.8 | 5.3 | 13.3 | 5.6 |
|  |  | Mullite |  | 23.2 | 21.8 | 22.6 | 22.3 | 17.2 |
|  |  | Quartz |  | 15.5 | 12.1 | 9.9 | 7.8 | 5.7 |
|  |  | Cristobalite |  | ○ | ○ | ○ | ○ | ○ |
| Body physical properties | Drying shrinkage rate (%) |  |  | 2.4 | 2.2 | 2.7 | 2.6 | 2.3 |
|  | Firing shrinkage rate (%) |  |  | 3.2 | 3.4 | 3.8 | 3.7 | 3.5 |
|  | Total shrinkage rate (%) |  |  | 5.5 | 5.5 | 6.4 | 6.2 | 5.7 |
|  | Firing bending (mm) |  |  | 4.1 | 4.4 | 4.3 | 5 | 5.8 |
|  | Bending strength (Mpa) |  |  | 50 | 59 | 55 | 59 | 71 |
|  | Therm. expan. coeff. $\times 10^{-7}$ (/° C.) |  |  | 81 | 77 | 72 | 68 | 63 |
|  | Therm. shock resist. $\Delta T$ (° C.) |  |  | 130 | 120 | 120 | 130 | 140 |
|  | Water absorbing rate (%) |  |  | 18.4 | 17.5 | 16 | 17.2 | 15.8 |
|  | Apparent density (g/cm$^3$) |  |  | 2.7 | 2.71 | 2.71 | 2.79 | 2.7 |
|  | Bulk density (g/cm$^3$) |  |  | 1.82 | 1.83 | 1.87 | 1.93 | 1.89 |

TABLE 7

|  |  |  | Body No. | 5-1 | 5-2 | 5-3 | 5-4 |
|---|---|---|---|---|---|---|---|
| Raw materials used (○; Present) | Pottery stone A |  |  | ○ | ○ | ○ | ○ |
|  | Wax stone |  |  | — | — | — | — |
|  | Kaoline |  |  | ○ | ○ | ○ | ○ |
|  | Sericite |  |  | ○ | ○ | ○ | ○ |
|  | Clay |  |  | ○ | ○ | ○ | ○ |
|  | Silica sand |  |  | — | — | — | — |
|  | Chamotte A |  |  | — | — | — | — |
|  | Chamotte B |  |  | ○ | ○ | ○ | ○ |
|  | Chamotte C |  |  | — | — | — | — |
|  | Fired alum shale A |  |  | ○ | ○ | ○ | ○ |
|  | Fired alum shale B |  |  | — | — | — | — |
|  | Feldspar |  |  | — | — | — | — |
|  | Dolomite |  |  | — | — | ○ | — |
|  | Limestone |  |  | — | ○ | — | — |
|  | Wollastonite |  |  | — | — | — | ○ |
| Main minerals in body raw materials (wt %) | Clay minerals | Kaoline minerals |  | 41.2 | 40 | 40 | 40 |
|  |  | Sericite |  | 4.9 | 4.7 | 4.7 | 4.7 |
|  |  | Pyrophyllite |  | 14.4 | 13.9 | 13.9 | 13.9 |
|  | Quartz |  |  | 18.2 | 17.7 | 17.7 | 17.7 |
|  | Cristobalite |  |  | — | — | — | — |
|  | Corundum |  |  | 8 | 6.8 | 6.8 | 6.8 |
|  | Mullite |  |  | 9.7 | 7.8 | 7.8 | 7.8 |
| Average grain size of raw material ($\mu$m) |  |  |  | 4.4 | 4.4 | 4.4 | 4.4 |
| Firing temperature (° C.) |  |  |  | 1200 | 1200 | 1200 | 1200 |
| Body composition (wt %) | Chemical Composition of body | $SiO_2$ |  | 59.1 | 58.1 | 58.2 | 58.9 |
|  |  | $Al_2O_3$ |  | 37.7 | 37.1 | 37.1 | 36.6 |
|  |  | $Na_2O$ |  | 0.08 | 0.07 | 0.07 | 0.07 |
|  |  | $K_2O$ |  | 1.02 | 1 | 1 | 1 |
|  |  | MgO |  | 0.18 | 0.18 | 0.79 | 0.2 |
|  |  | CaO |  | 0.32 | 2.08 | 1.34 | 1.76 |
|  |  | Others |  | 1.6 | 1.47 | 1.5 | 1.47 |

TABLE 7-continued

| | Body No. | | 5-1 | 5-2 | 5-3 | 5-4 |
|---|---|---|---|---|---|---|
| | Alkali metal oxides (total) | | 1.10 | 1.07 | 1.07 | 1.07 |
| | Alkali earth metal oxides (total) | | 0.5 | 2.3 | 2.1 | 2.0 |
| | Minerals | Corundum | 9.5 | 8 | 7.8 | 7.5 |
| | contained | Mullite | 21.8 | 22 | 20.2 | 22.3 |
| | | Quartz | 12.7 | 10.1 | 8.4 | 10.9 |
| | | Cristobalite | ○ | ○ | ○ | ○ |
| Body | Drying shrinkage rate (%) | | 2.5 | 2.6 | 2.6 | 2.5 |
| physical | Firing shrinkage rate (%) | | 3.7 | 3.3 | 5 | 3 |
| properties | Total shrinkage rate (%) | | 6.1 | 5.8 | 7.5 | 5.4 |
| | Firing bending (mm) | | 2.6 | 2.3 | 4.2 | 3 |
| | Bending strength (Mpa) | | 61 | 62 | 77 | 77 |
| | Therm. expan. coeff. $\times 10^{-7}$ (/° C.) | | 86 | 79 | 80 | 79 |
| | Therm. shock resist. $\Delta T$ (° C.) | | 120 | — | — | — |
| | Water absorbing rate (%) | | 16 | 17.6 | 14.7 | 15.3 |
| | Apparent density (g/cm$^3$) | | 2.72 | 2.72 | 2.72 | 2.72 |
| | Bulk density (g/cm$^3$) | | 1.95 | 1.87 | 2.01 | 1.98 |

In the compositions of the bodies, the total content of the monovalent metal oxides is the total sum of the contents of the monovalent metal oxides, $Na_2O$, $K_2O$, and the like, and the total content of the alkali earth oxides is the total sum of the contents of the alkali earth oxides, MgO, CaO, and the like, both in the chemical composition of the body. As for cristobalite among the minerals contained, the symbol ○ indicates the case where the content of cristobalite is not determined, but it is present.

Table 2 shows a comparison between the conventional technology and the technology of the present invention. The body No. 1-1 is referred to as vitrifiable body, the body No. 1-2 as engobe body, and the body No. 1-3 as ironstone body, and these bodies have been conventionally used for sanitary ware. The body No. 1-4 is a body used in the prior art, in which pottery stone, kaoline, and clay are the main raw materials, and the firing flux components such as alkali oxides and the like are adjusted to be small in content so that the firing shrinkage and softening deformation may be small.

On the other hand, the body No. 1-5 is a body of the present invention in which wollastonite is used as a body raw material, the uneven CaO distribution portions are dispersed, and about 1.8 wt % of CaO is contained.

The firing shrinkage rate, bulk density, and bending strength are respectively 4.5%, 1.84 g/cm$^3$, and 43.2 MPa for the body No. 1-4, whereas they are respectively 4.1%, 1.81 g/cm$^3$, and 60.3 MPa for the body No. 1-5. In this manner, the body of the present invention has the firing shrinkage rate and bulk density both of the same order as those of the body of the prior art, but nevertheless the strength is largely improved.

The body of the present invention has the following composition characteristics. In the body, there are those uneven CaO distribution portions which are higher in the CaO concentration than the other portions. Furthermore, in those uneven CaO distribution portions, the concentrations of the divalent metal oxides other than CaO and the concentrations of alkali oxides tend to be lower as compared with those in the other portions. The observed results associated with the above description are shown below.

Figure 1:
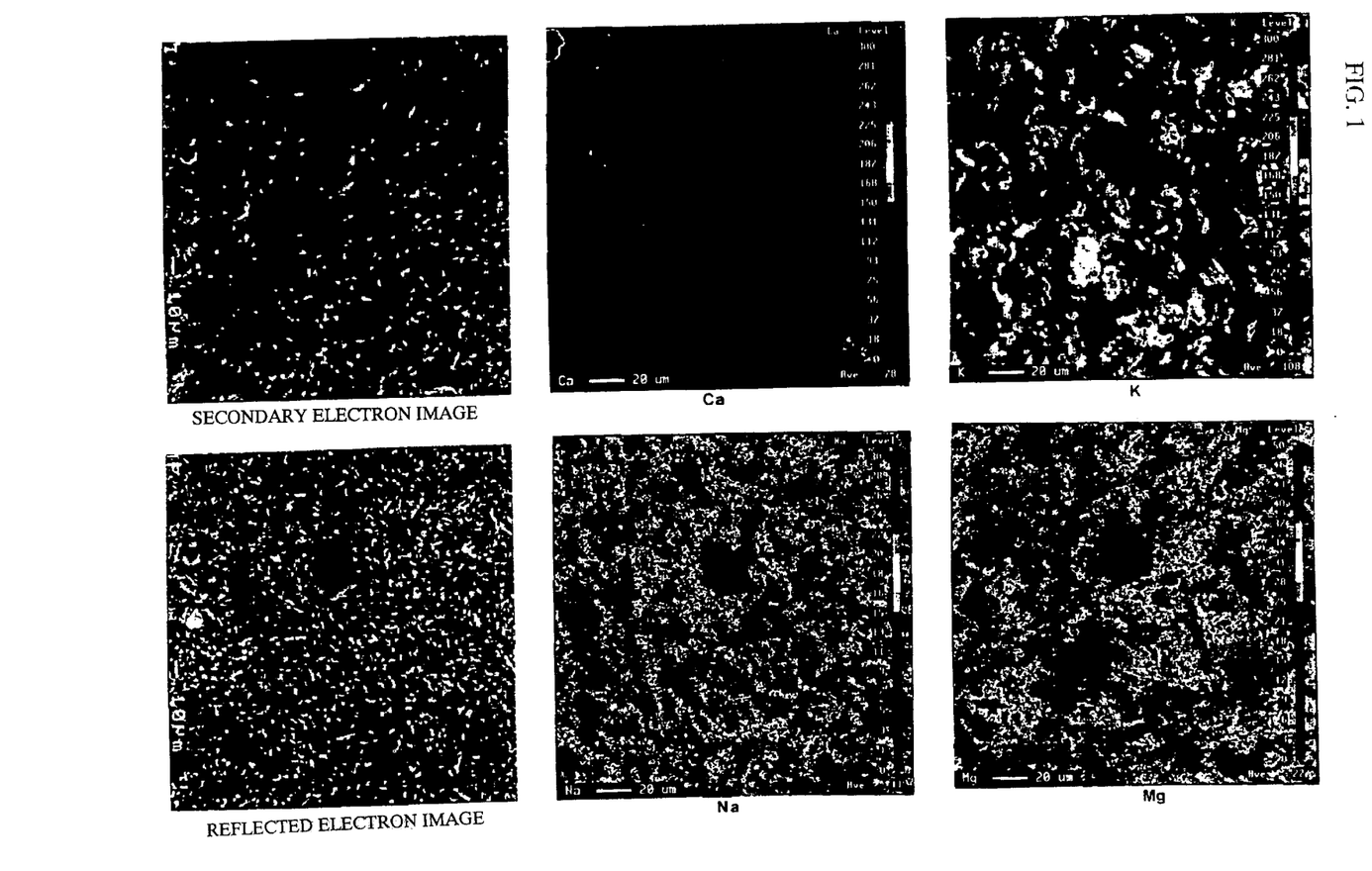
FIG. 1 shows the SEM images of the section of the body No. 1-4 (a comparative example) and the distribution states of Ca, Mg, Na, and K in the section observed by EPMA.
Figure 2:
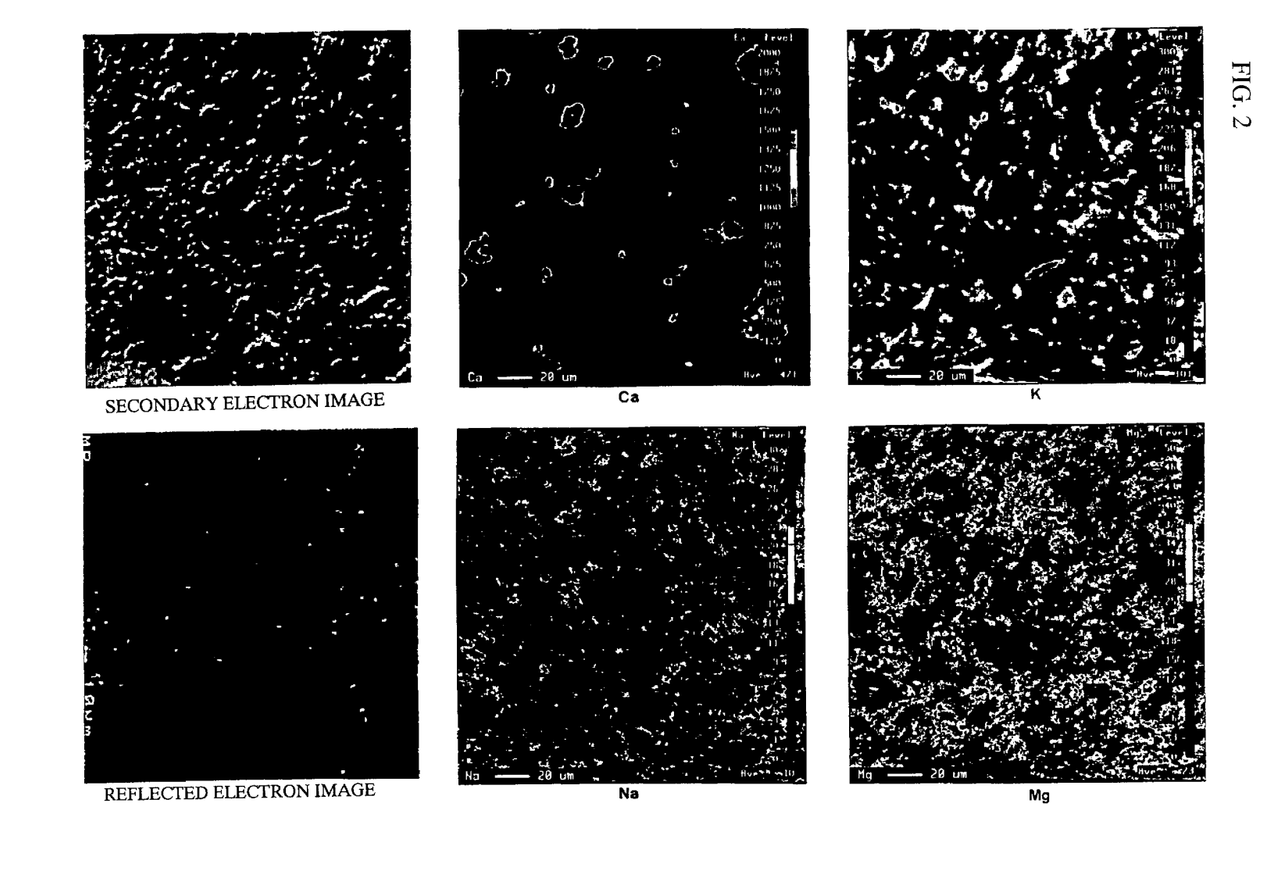
FIG. 2 shows the SEM images of the section of the body No. 1-5 (one embodiment of the present invention) and the distribution states of Ca, Mg, Na, and K in the section observed by EPMA.

FIG. 1 shows the SEM images of the cross section of the body No. 1-4 and the distribution states of Ca, Mg, Na, and K in the cross section observed by EPMA, and FIG. 2 shows the SEM images of the cross section of the body No. 1-5 and the distribution states of Ca, Mg, Na, and K in the cross section observed by EPMA. In the body No. 1-5, the contents of CaO, MgO, $K_2O$, and $Na_2O$ are respectively 1.77, 0.17, 1.2, and 0.02 wt %, and the uneven CaO distribution portions come from the wollastonite grains dispersed in the raw material; the CaO content ratio in wollastonite is about 46 wt %, and hence the CaO concentration in the uneven CaO distribution portions is at least several wt % or above, and the total content sum of MgO, $K_2O$, and $Na_2O$ is 1.5 wt % or below.

It can be interpreted that in the uneven CaO distribution portions, the contents of the divalent metal oxides other than CaO and the alkali oxides are small, and hence the uneven CaO distribution portions are not converted to liquid phase, but are crystallized to form a mineral containing Ca.

Figure 3:
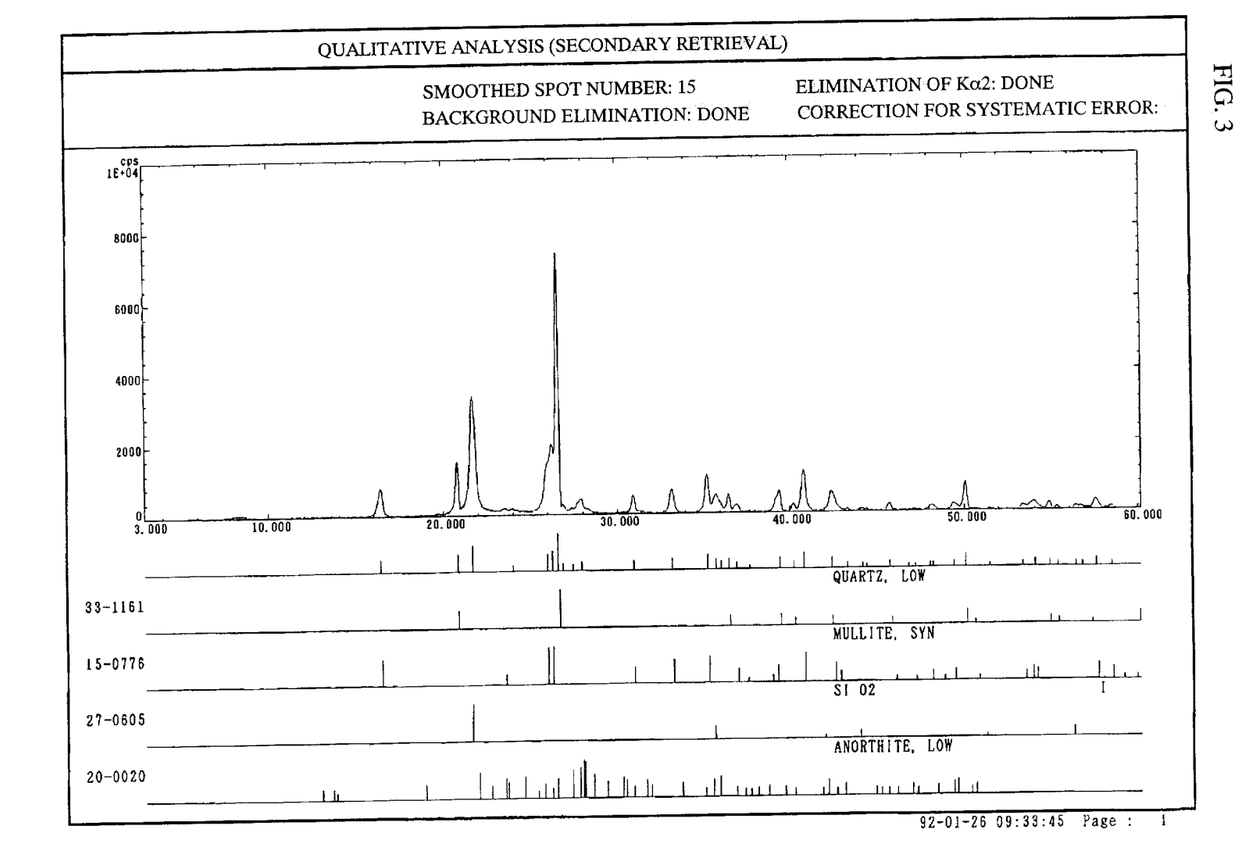
FIG. 3 shows the X-ray diffraction chart of the body No. 1-5 (one embodiment of the present invention)

The X-ray diffraction chart of the body No. 1-5 is shown in FIG. 3, where the formation of a mineral containing Ca, anorthite ($CaAl_2Si_2O_8$), can be confirmed. The glass phase contents of the body No. 1-1 and the body No. 1-2 are respectively 59 and 52 wt %. In other words, the CaO component segregation portions in which the CaO component is segregated are dispersed, and thereby the shrinkage associated with the liquid phase sintering is suppressed in these portions, consequently the firing shrinkage being suppressed. Furthermore, since the CaO component segregation portions are present which portions are different in such mechanical properties as Young's modulus and the like from the liquid phase, the crack deflection effect takes place and the mechanical strength can take a satisfactory value.

As described above, in the body of the present invention, the characteristics are remarkably improved owing to the presence of the CaO component segregation portions.

Tables 3 and 4 list the bodies No. 2-1 to No. 2-10 which have the characteristic features of the present invention. Tables 5 to 8 show the test results which constitute the bases of the present invention. Table 5 lists the bodies No. 3-1 to No. 3-3, Table 6 lists the bodies No. 4-1 to No. 4-5, and Table 7 lists the bodies No. 5-1 to No. 5-4. Table 8 shows the chemical composition of the glaze used in the present invention. The glaze is the one which is referred to as bristol glaze and generally used for sanitary ware.

TABLE 8

|  | SiO$_2$ | Al$_2$O$_3$ | TiO$_2$ | Fe$_2$O$_3$ | CaO | MgO | Na$_2$O | K$_2$O | ZnO |
|---|---|---|---|---|---|---|---|---|---|
| Chemical composition (wt %) | 66.3 | 10.1 | 0.70 | 0.20 | 12.5 | 1.30 | 0.60 | 3.80 | 5.00 |

Figure 4:
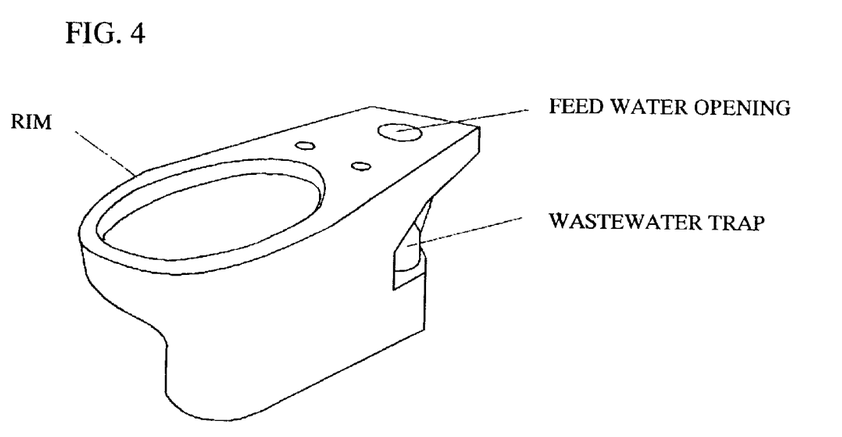
FIG. 4 shows a schematic view of a stool produced as a prototype in one embodiment of the present invention.
Figure 5:
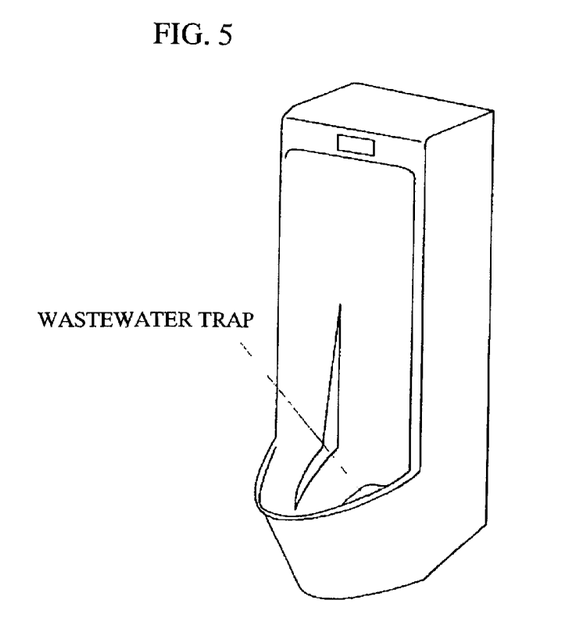
FIG. 5 shows a schematic view of a stall urinal produced as a prototype in one embodiment of the present invention.
Figure 6:
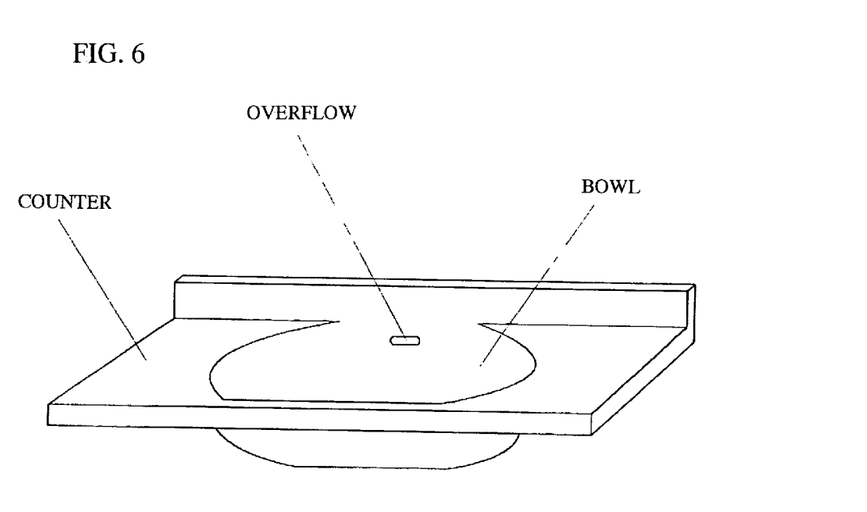
FIG. 6 shows a schematic view of a counter-integrated wash bowl produced as a prototype in one embodiment of the present invention.

FIGS. 4 to 7 are the schematic views of the sanitary wares produced in the embodiments as prototypes. FIG. 4 shows a stool, FIG. 5 a stall urinal, FIG. 6 a counter-integrated wash bowl, and FIG. 7 a wash bowl.

The sanitary wares shown in FIGS. 4 to 7 were produced as prototypes by molding with the slip casting method using the plaster molds, subjecting to the processes of finish processing, drying, and glaze applying, and finally firing. As the glaze, the one shown in Table 8 was used. The thermal expansion coefficient of the glaze is $5.1 \times 10^{-7}/°$ C. In these sanitary wares produced as prototypes, all the portions to be in contact with water or wastewater were prevented from the water absorbability of body by applying glaze. The glazed portions include the interior of the rim working as a water channel and the interior surface of the wastewater trap in FIG. 4, the interior of the wastewater trap in FIG. 5, and the interior of the overflow in each of FIGS. 6 and 7.

Description will be made below on the individual items in Tables 4 to 7.

In Table 4, kiln crack means the fissure formed in a product by heat shock during the temperature falling process involved in a firing process, and the symbol ○ indicates no occurrence of the kiln crack, while the symbol×the occurrence thereof.

Figure 7:
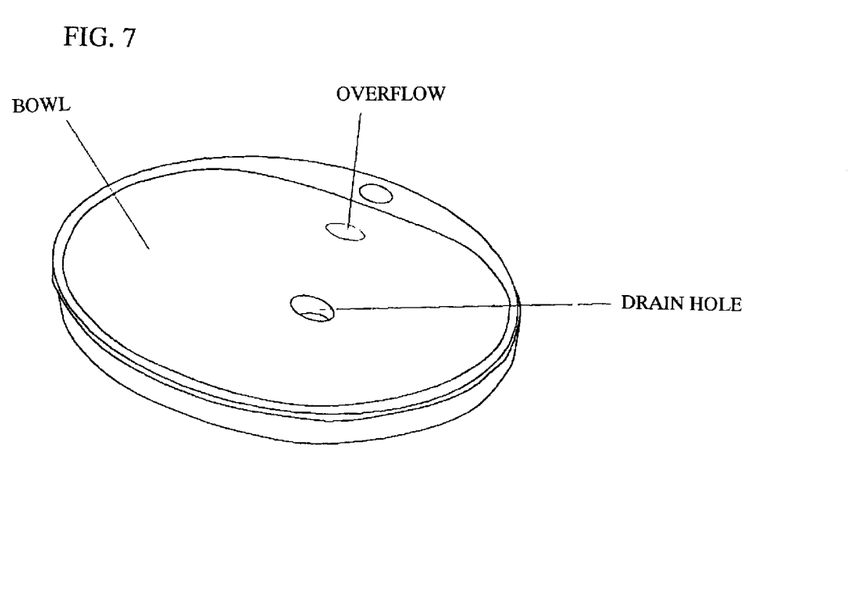
FIG. 7 shows a schematic view of a wash bowl produced as a prototype in one embodiment of the present invention.

In Table 4, the abrupt heating test means a test in which the bowl in FIG. 7 is subjected to a temperature difference of 80° C., and is examined as to whether fissures are formed due to heat shock. The temperature difference of 80° C. was provided by the following way; a volume of cold water of 10° C. was poured into the bowl of the wash bowl to allow the wash bowl to be maintained at 10° C., and subsequently the cold water was removed, and immediately a volume of water at 90° was poured into the bowl. In the table, the symbol ○ indicates no occurrence of fissure, while the symbol×the occurrence thereof.

The bodies No. 2-1 to 2-10 is the bodies of the present invention. The body No. 2-1 is the one which uses chamotte B containing 2.4 wt % of CaO, while the body No. 2-2 is the one in which the CaO content is adjusted to be about 2.1 wt % by adding limestone. Both bodies are small in firing shrinkage rate and softening deformation during firing, and shows excellent strengths for the bulk density. The bodies No. 2-3 is the one in which chamotte B is used and the CaO content is adjusted to be about 4.1 wt % by adding limestone and wollastonite, the firing shrinkage and bulk density can be suppressed each to a low level, and moreover, the strength is excellent. The body No. 2-4 is the one in which chamotte C containing 0.24 wt % of CaO, and the CaO content is adjusted to be about 3.6 wt % by adding limestone and wollastonite. The body No. 2-5 is the one in which is used the fired alum shale A containing about 80 wt % of a corundum which contains 0.3 wt % of CaO, and the CaO content is adjusted to be about 3.6 wt % by adding limestone and wollastonite. The body No. 2-6 is the one in which is used the fired alum shale B containing about 33 wt % of a corundum which contains 0.25 wt % of CaO, and the CaO content is adjusted to be about 3.6 wt % by adding limestone and wollastonite. Any of the bodies No. 2-4 to No. 2-6 is small in firing shrinkage and softening deformation during firing, and excellent in strength for the bulk density. As described above, an excellent strength can be obtained for the body bulk density, by forming the uneven CaO distribution portions in the body, even when there is used a chamotte low in CaO content, or a raw material other than chamotte which is small in ignition loss.

The bodies No. 2-7 to No. 2-10 are the ones in each of which chamotte B is used, the CaO content is adjusted to be about 3.9 wt %, and the body properties such as the thermal expansion coefficient, firing shrinkage, and the like are controlled by varying the alkali and quartz contents. Any of these bodies is small in firing shrinkage and softening deformation during firing, and is high in strength for the bulk density. Particularly, the bodies No. 2-9 and No. 2-10 are comparable in strength with the vitrifiable body (No. 1-1) shown in Table 2 which is used for sanitary wares, and for each thereof the firing shrinkage and softening deformation during firing are respectively ⅓ and ⅙ of those of the vitirfiable body.

As for the bodies No. 2-7 to No. 2-10, four kinds of sanitary wares were produced as prototypes, and the relevant results are presented. In general, the fissure referred to as kiln crack becomes to easily occur during firing with increasing complexity in structure, whereas the kiln crack becomes to scarcely occur as the thermal expansion coefficient of the body becomes small, and hence it is necessary to consider about setting the thermal expansion coefficient according to the shapes of the articles produced.

As for stall urinals, counter-integrated wash bowls, wash bowls, and the like, these sanitary wares can be produced without occurrence of the kiln crack, when the thermal expansion coefficient is set to be $90 \times 10^{-7}/°$ C. or below.

As for stools which are more complex in structure, it is possible to produce such sanitary wares without occurrence of the kiln crack when the thermal expansion coefficient is set to be $70 \times 10^{-7}/°$ C. or below.

As will be described later, for the purpose of decreasing the thermal expansion coefficient, there are available a method of decreasing the quartz content in the body and a method of increasing the firing shrinkage. Of these two methods, the method of decreasing the quartz content in the body is particularly preferable for the present invention.

As for stall urinals, counter-integrated wash bowls, wash bowls, and the like, the quartz content is preferably 20 wt % or below, while as for stools more complex in shape, the quartz content is preferably 10 wt % or below.

Table 5 shows the body characteristics of the bodies in which chamotte B is used and the grain size of the body raw material is varied. The relation of the strength relative versus the bulk density is improved by adjusting the grain size of the raw material to be finer. In addition, simultaneously, the reducing effect of the softening deformation during firing is also obtained. In order to obtain sanitary ware of good quality, the average grain size of a body raw material is preferably adjusted to be 10 μm or below.

Table 6 shows the relationship between the quartz content in a body raw material and the quartz content in a body, and in addition, the relationship between the quartz content and the thermal expansion coefficient of a body. A part of the quartz component in a body raw material is vitrified by firing, and hence the quartz content in a body is decreased nearly relatively. As shown for the bodies No. 4-1 to No. 4-4, there is a clear correlation between the quartz content and the thermal expansion coefficient of the body, the thermal expansion coefficient increasing with increasing quartz content. The thermal expansion coefficient, however, is not merely defined by the quartz content in the body; there is such a case where as can be seen from comparison of the bodies No. 4-2 to No. 4-5, the quartz contents in the body raw materials are similar to each other, but the quartz contents in the bodies are different from each other, and the thermal expansion coefficient are largely different from each other.

From the results of the above described real object tests (the bodies No. 2-7 to No. 2-10), as for stall urinals, counter-integrated wash bowls, wash bowls, and the like, the quartz content is preferably 20 wt % or below, and as for stools which are more complex in shape, the quartz content is preferably 10 wt % or below.

Table 7 shows the examples where the raw material (chamotte B) large in the content of the Ca component and small in ignition loss was added to the body raw materials, and among them the bodies No. 5-2 to No. 5-4 are the examples for comparing the body characteristics in the cases where limestone, dolomite, and wollastonite were respectively used as the raw materials for introducing CaO.

As can be seen from the bodies No. No. 5-1 to No. 5-4, it is possible to produce the sanitary ware in which the firing shrinkage and firing deformation are sufficiently small, and moreover, the strength versus the bulk density is excellent.

In the body No. 5-2 where limestone was used, the strength is not found to be improved, but the firing shrinkage, firing deformation, and bulk density are decreased and the strength versus the bulk density is improved.

In the body No. 5-3 where dolomite was used, a large improvement in strength can be seen. When dolomite is used, however, the firing shrinkage rate and the softening deformation during firing become large, and hence it is preferable to suppress the firing shrinkage rate and deformation, as in the present embodiment, by simultaneously using a raw material which contains a large amount of the Ca component and is small in ignition loss (for example, chamotte B).

In the body No. 5-4 where wollastonite was used, the firing shrinkage rate is decreased and the firing deformation is not changed appreciably, but nevertheless the strength is improved largely.

As described above, the body characteristics become different depending on the kind of the raw material for use in introducing CaO; nevertheless, as can be seen, the strength versus the bulk density tends to be improved in the present embodiment.

Accordingly, when there is used a raw material which contains a large amount of the Ca component and is small in ignition loss (for example, chamotte B), a variety of raw materials other than wollastonite, limestone, and dolomite can be used as a raw material for use in introducing CaO.

The firing shrinkage and softening deformation during firing became relatively large when dolomite was used, contrary to the cases where limestone and wollastonite were used, and this is ascribable to the fact that MgO was introduced into the body by use of dolomite and the MgO promoted the conversion of the body to the liquid phase.

Accordingly, for the purpose of forming the uneven CaO distribution portions in the body and expecting the effects thereof to be operative to the fullest extent, it is more preferable to also suppress the contents of such divalent metal oxides other than CaO that possibly promote the conversion to liquid phase, in addition to the suppression of the contents of the alkali oxides in the body.

Industrial Applicability

According to the present invention, it becomes possible to provide the sanitary ware for which it is possible to accurately design the shapes and dimensions of the products after being subjected to firing while maintaining the mechanical strength required to sanitary ware, degradation of the process yield caused by shrinkage and deformation scarcely occurs, and the setting efficiency and productivity are improved as compared to the prior art.

What is claimed is:

1. Sanitary ware comprising a ceramic body and a glaze layer formed on the desired portions of the ceramic body, characterized in that:

said body is a body comprising a crystal phase containing mullite and quartz as main components, a glass phase containing $SiO_2$ and $Al_2O_3$ as the main components, and a crystal phase composed of minerals selected according to need from cristobalite, andalusite, sillimanite, kyanite, and corundum;

the main components of the body are 50 to 65 wt % $SiO_2$, 30 to 45 wt % $AL_2O_3$, 0.1 to 2 wt % alkali oxides, and 0.1 to 10 wt % divalent metal oxides;

at least a CaO component is contained as the component of said divalent metal oxides; and CaO component segregation portions in which said CaO component is segregated are dispersed in said body.

2. The sanitary ware according to claim 1 characterized in that the total crystal phase in said sanitary ware is dispersed in said glass phase, and the composition ratio of said glass phase to said body is smaller than 60 wt %.

3. The sanitary ware according to claim 1 characterized in that the relations between the abundance ratios (weight ratios) of Ca to Na, K, and Mg in said CaO component segregation portions satisfy all the relationships of Ca>Na, Ca>K, and Ca>Mg.

4. The sanitary ware according to claim 1 characterized in that the content of said CaO component in said body is 1 wt % or above.

5. The sanitary ware according to claim 1 characterized in that the relationship between the CaO component and the component of the other divalent metal oxides in said body is such that the component of the other divalent metal oxides is 50 parts by weight or below in relation to 100 parts by weight of CaO.

6. The sanitary ware according to claim 1 characterized in that in said body the divalent metal oxide component is present in 100 parts by weight or above in relation to 100 parts by weight of the alkali oxide component.

7. The sanitary ware according to claim 1 characterized in that the content of quartz in said body is 20 wt % or below.

8. The sanitary ware according to claim 1 characterized in that in the case where corundum is contained in said body, the content of corundum is 20 wt % or below.

9. Sanitary ware which can be produced by the method comprising a process for molding the body raw material, a process for applying glaze, according to need, onto the desired portions, and a process for firing at the temperatures 1100 to 1300° C., and which is characterized in that:

said body raw material contains a clay mineral, quartz, a raw material containing alkali metals, and a raw material containing divalent metals;

said clay mineral is a mineral which contains at least one mineral selected from kaolinite, dickite, halloysite, sericite, and pyrophyllite;

at least one mineral of wallastonite, limestone, and anorthite is contained as said raw material containing divalent metals;

the content of said quartz is 30 wt % or below in relation to the said body raw material;

the content of said clay mineral is 30 to 90 wt % in relation to the said body raw material; and said body raw material is controlled in size so that the average grain size based on a laser diffraction grain size analyzer is 3 to 10 μm.

10. Sanitary ware which can be produced by the method comprising the process for molding the body raw material, the process for applying glaze, according to need, onto the desired portions, and the process for firing at the temperatures 1100 to 1300° C., and which is characterized in that:

said body raw material contains a clay mineral, quartz, a raw material containing alkali metal oxides, a raw material containing divalent metal oxides, and a raw material small in ignition loss;

said clay mineral is a mineral which contains at least one mineral selected from kaolinite, dickite, halloysite, sericite, and pyrophyllite;

the content of said quartz is 30 wt % or below in relation to said body raw material;

the content of said clay mineral is 30 to 90 wt % in relation to said body raw material;

said raw material small in ignition loss is 5 to 50 wt % in relation to said body raw material; and said body raw material is controlled in size so that the average grain size based on a laser diffraction grain size analyzer is 3 to 10 μm.

11. Sanitary ware which can be produced by the method comprising the process for molding the body raw material, the process for applying glaze, according to need, onto the desired portions, and the process for firing at the temperatures 1100 to 1300° C., and which is characterized in that:

said body raw material contains a clay mineral, quartz, a raw material containing alkali metal oxides, a raw material containing divalent metal oxides, and a raw material small in ignition loss;

said clay mineral is a mineral which contains at least one mineral selected from kaolinite, dickite, halloysite, sericite, and pyrophyllite;

the content of said quartz is 30 wt % or below in relation to said body raw material;

the content of said clay mineral is 30 to 90 wt % in relation to said body raw material;

said raw material small in ignition loss is 5 to 50 wt % in relation to said body raw material;

said body raw material is controlled in size so that the average grain size based on a laser diffraction grain size analyzer is 3 to 10 μm; and at least one mineral of wollastonite, limestone, and anorthite is contained as said raw material containing divalent metal oxides.

12. The sanitary ware according to claim 10 characterized in that:

said raw material small in ignition loss is chamotte, and the main mineral in said chamotte is at least one mineral selected from mullite, cristobalite, quartz, and corundum; and the content of CaO in said chamotte is 1 wt % or above.

13. Sanitary ware which can be produced by the method comprising the process for molding the body raw material, the process for applying glaze, according to need, onto the desired portions, and the process for firing at the temperatures 1100 to 1300° C., and which is characterized in that:

said body raw material contains a clay mineral, quartz, a raw material containing alkali metal oxides, a raw material containing divalent metal oxides, and a raw material small in ignition loss;

said clay mineral is a mineral which contains at least one mineral selected from kaolinite, dickite, halloysite, sericite, and pyrophyllite;

the content of said quartz is 30 wt % or below in relation to said body raw material;

the content of said clay mineral is 30 to 90 wt % in relation to said body raw material;

said raw material small in ignition loss is 5 to 50 wt % in relation to said body raw material;

said body raw material is controlled in size so that the average grain size based on a laser diffraction grain size analyzer is 3 to 10 μm; and said raw material small in ignition loss is a hollow glass containing $SiO_2$ and $AL_2O_3$ as the main components.

14. The sanitary ware according to claim 10 characterized in that said raw material small in ignition loss is at least one material selected from shirasu balloon, expanded perlite, and expanded shale.

15. The sanitary ware according to claim 1 characterized in that the glaze is such that said glaze layer is smaller in thermal expansion coefficient than said body by 0 to $30 \times 10^{-7}$/°C.

16. The sanitary ware according to claim 1 characterized in that said glaze layer is composed of a transparent glaze.

17. The sanitary ware according to claim 1 characterized in that said glaze layer is composed of two or more kinds of glaze layers different from each other in composition.

18. The sanitary ware according to claim 17 characterized in that said glaze layer is composed of two or more glazes selected from engobe, a coloring glaze, and a transparent glaze.

19. The sanitary ware according to claim 18 characterized in that said engobe is smaller in porosity than the body.

20. The sanitary ware according to claim 1 characterized in that the portion where engobe is not formed is provided to a part or to the whole of said sanitary ware.

21. The sanitary ware according to claim 20 characterized in that the portion where said engobe is formed mainly falls in the portion where the coloring glaze layer is formed on the two side surfaces of said body, and in addition the engobe is formed on only one side surface.

22. The sanitary ware according to claim 18 characterized in that the surface roughness Ra of said transparent glaze layer as measured with a stylus-type surface roughness analyzer (JIS-B0651) is 100 nm or below.

23. The sanitary ware according to claim 18 characterized in that the surface roughness Ra of said transparent glaze layer as measured with a stylus-type surface roughness analyzer (JIS-B0651) is 70 nm or below.

24. The sanitary ware according to claim 18 characterized in that the surface roughness Ra of said transparent glaze layer as measured with a stylus-type surface roughness analyzer (JIS-B0651) is 40 nm or below.

25. The sanitary ware according to one of claims 18 to 21 characterized in that the raw material for use in forming said engobe is a powder raw material in which the 50% grain size (D50) is 6 μm or below.

26. The sanitary ware according to claim 25 characterized in that the raw material for use in forming said engobe is composed of 30 to 50 wt % pottery stone, 30 to 50 wt % clay, and 10 to 30 wt % flux.

27. The sanitary ware according to one of claims 9 to 15 characterized in that said process of applying glaze according to need onto the desired portions includes the process of applying a transparent glaze.

28. The sanitary ware according to one of claims 9 to 15 characterized in that said process of applying glaze according to need onto the desired portions includes the process of applying a coloring glaze, and the process of applying a transparent glaze onto the desired portions of the coloring glaze applied surface.

29. The sanitary ware according to one of claims 9 to 15 characterized in that said process of applying glaze according to need onto the desired portions includes the process of applying engobe, and the process of applying a coloring glaze onto the engobe and onto the desired portions of the body surface.

30. The sanitary ware according to one of claims 9 to 15 characterized in that said process of applying glaze according to need onto the desired portions includes the process of applying engobe, and the process of applying a transparent glaze onto the engobe and onto the desired portions of the body surface.

31. The sanitary ware according to one of claims 9 to 15 characterized in that said process of applying glaze according to need onto the desired portions includes the process of applying engobe, the process of applying a coloring glaze onto the engobe and onto the desired portions of the body surface, and the process of applying a transparent glaze onto the desired portions of the coloring glaze applied surface.

32. The sanitary ware according to one of claims 1 to 24 characterized in that the thermal expansion coefficient of said body is 50 to $90 \times 10^{-7}$ (/° C.). (50 to 600° C.).

33. The sanitary ware according to one of claims 1 to 24 characterized in that the impact strength of said body is $2 \times 10^{-1}$ J/cm$^2$ or above.

34. The sanitary ware according to one of claims 9 to 24 characterized in that the molding method in said molding process is the slip casting method.

35. The sanitary ware according to one of claims 1 to 24 characterized in that said sanitary ware is any of a washhand basin, a wash bowl, a urinal, a stool, a toilet tank, a toilet strainer, a sink, a baby bath, or a shower pan.

* * * * *